United States Patent [19]

Sartorio et al.

[11] Patent Number: 5,345,806
[45] Date of Patent: Sep. 13, 1994

[54] DEVICE FOR MANIPULATING SHEET METAL PIECES

[75] Inventors: Franco Sartorio; Mario Scavino; Stefano Vergano, all of Turin, Italy

[73] Assignee: Amada Company, Limited, Japan

[21] Appl. No.: 752,591

[22] PCT Filed: Dec. 28, 1990

[86] PCT No.: PCT/JP90/01731

§ 371 Date: Aug. 28, 1991

§ 102(e) Date: Aug. 28, 1991

[87] PCT Pub. No.: WO91/09695

PCT Pub. Date: Jul. 11, 1991

[30] Foreign Application Priority Data

Dec. 29, 1989 [IT] Italy .................. 68190 A/89
Dec. 29, 1989 [IT] Italy .................. 68191 A/89

[51] Int. Cl.[5] .................................. B21D 43/00
[52] U.S. Cl. .................................. 72/422; 414/758
[58] Field of Search ............... 72/420, 422; 414/758; 901/6, 8

[56] References Cited

U.S. PATENT DOCUMENTS 3,910,423  10/1975  Killian .
3,954,164   5/1976  Bottomley .
5,042,287   8/1991  Sartorio .................. 72/422

FOREIGN PATENT DOCUMENTS 0266056   5/1988  European Pat. Off. .
3817117  11/1989  Fed. Rep. of Germany ........ 72/420
2223104  10/1974  France .
2556988   6/1985  France .
2584634   1/1987  France .
67834    9/1989  Italy .
68065   11/1989  Italy .
55-1937   1/1980  Japan .................. 72/420
55-48425   4/1980  Japan .................. 72/420
55-144330  11/1980  Japan .................. 72/420
63-74547   4/1988  Japan .................. 901/8
1-122620   5/1989  Japan .................. 72/420
2198881   6/1988  United Kingdom .

Primary Examiner—Lowell A. Larson
Assistant Examiner—Donald M. Gurley
Attorney, Agent, or Firm—Wigman, Cohen, Leitner & Myers

[57] ABSTRACT

A device (12; 102) for manipulating sheet metal pieces (P) for a sheet metal processing machine (10; 101) is disclosed. The device (12; 102) comprises a plurality of manipulator units (20, 22; 106, 108, 110) with a plurality of gripping elements (32, 50, 52; 118, 126, 134) for gripping and moving the sheet metal pieces (P) so that the units (20, 22; 106, 108, 110) cooperate with one another in receiving a workpiece (P) from the associated processing machine (10; 101) and passing another workpiece (P) to the processing machine as well as such receiving from and passing to an associated device (4) for loading and discharging sheet metal pieces to utilize the processing machine (10; 101) as far as possible reducing its down times.

7 Claims, 8 Drawing Sheets

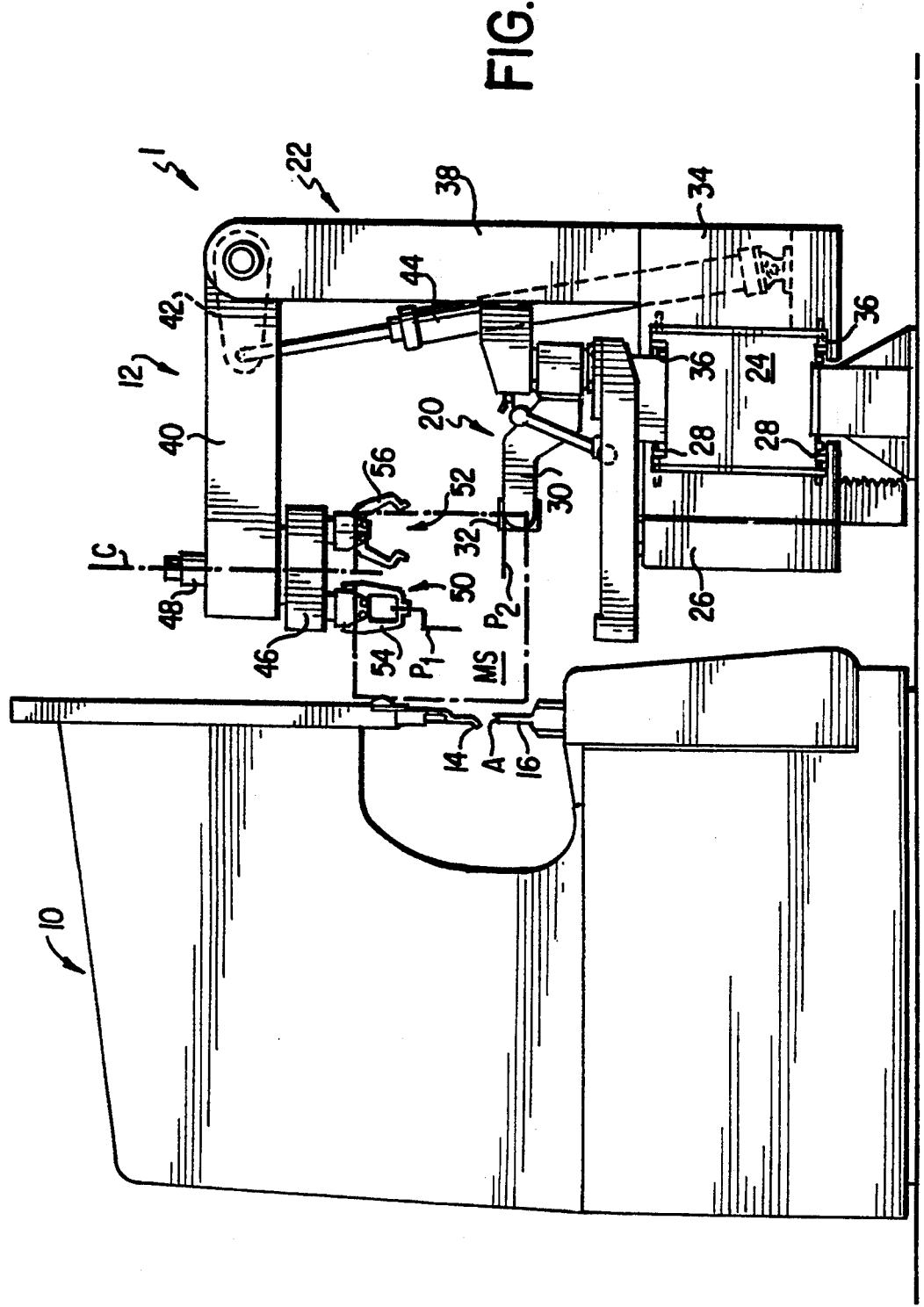

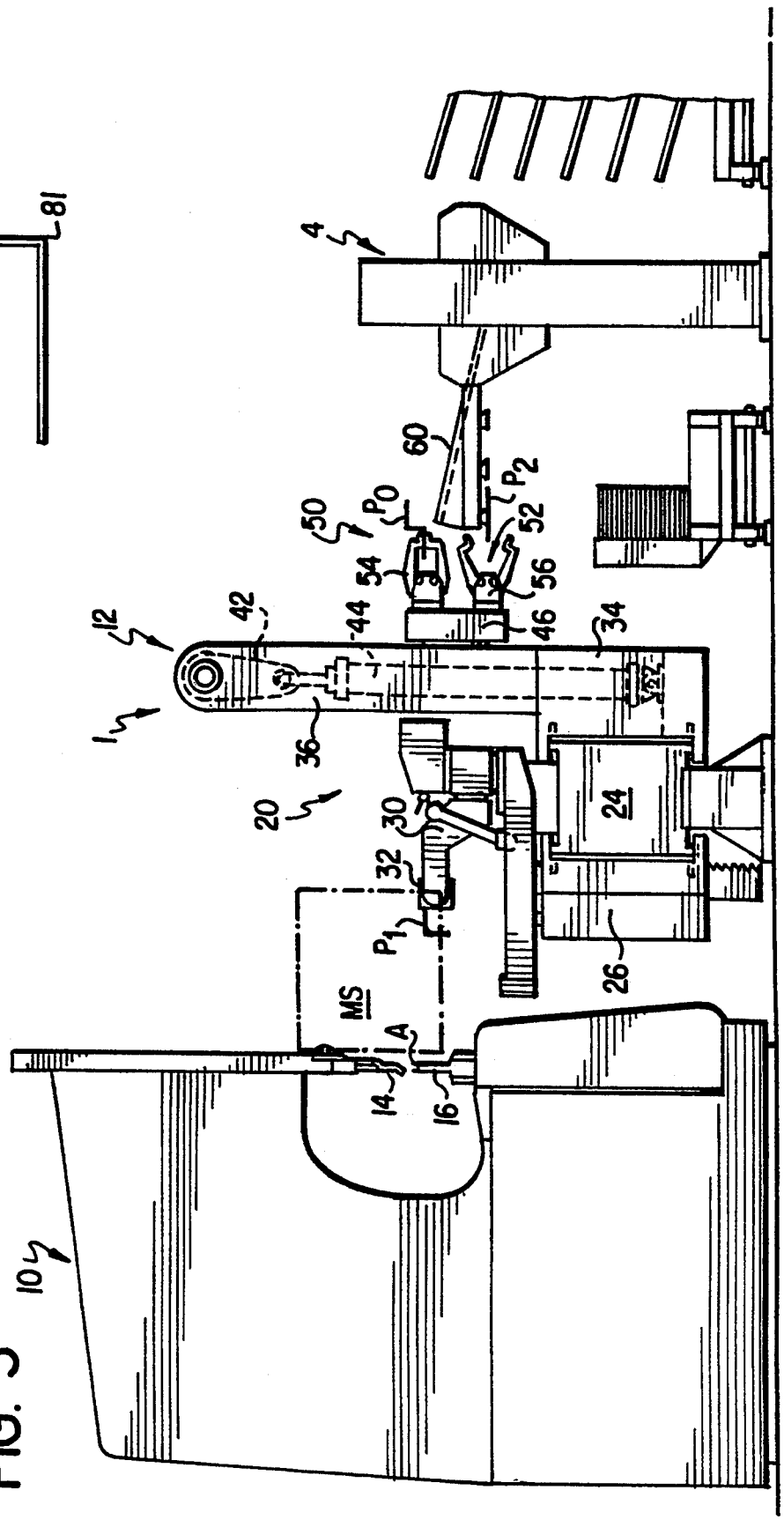

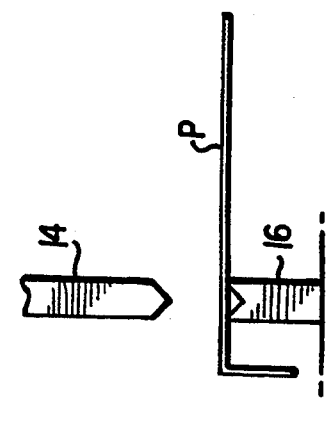
FIG. 9(a)
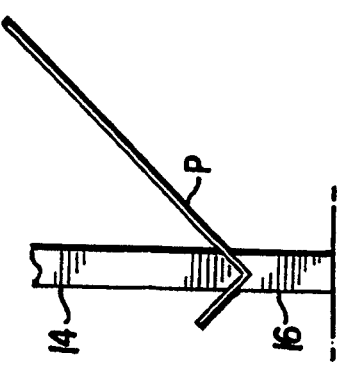
FIG. 9(b)
FIG. 9(c)
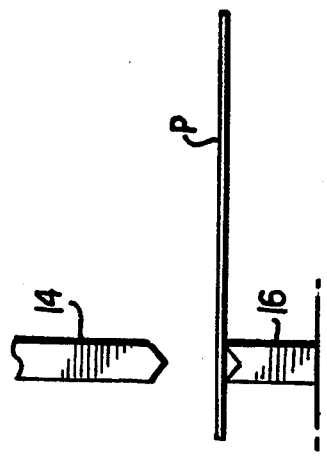
FIG. 9(d)
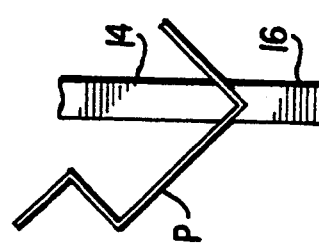
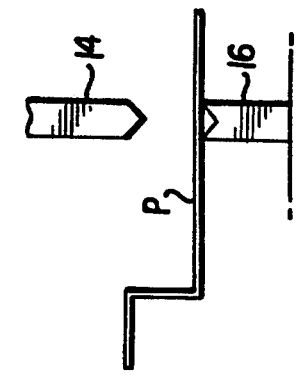
FIG. 9(e)
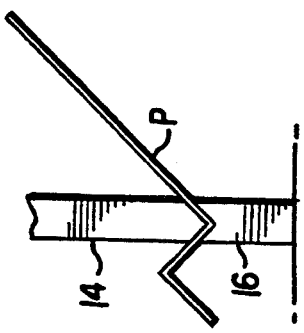
FIG. 9(f)

DEVICE FOR MANIPULATING SHEET METAL PIECES

TECHNICAL FIELD

The present Invention relates to a device for manipulating a plurality of sheet metal pieces at the same time used for a sheet metal processing machine such as a bending machine, folding machine or punching machine.

BACKGROUND ART

Italian Patent Application No. 67224-A/88 (U.S. Pat. No. 5,042,287, is the U.S. counterpart) discloses a manipulator device for a sheet metal bending press, comprising the following:

a main manipulator unit provided with at least one element for gripping a sheet metal piece, which is movable in a manipulation space in front of a loading zone of the press and is arranged to move sheet metal pieces during an automatic bending cycle, and an auxiliary manipulator unit provided with gripper means rotatable about an axis perpendicular to the bending line and arranged to grip a sheet metal piece and to turn it over about the said axis.

During a bending cycle carried out by means of this known device, there are many phases in which the manipulator device is engaged in moving a piece of sheet metal while the press is inoperative. The phases in which the press is inoperative are, for example, those in which the manipulator device discharges a finished piece and takes up a new flat metal sheet, as well as those in which the piece is overturned by means of the auxiliary manipulator unit.

DISCLOSURE OF INVENTION

The object of the present invention is to provide a manipulator device which allows the maximum use to be made of the productive capacity of the sheet metal processing machine as far as possible reducing its down times.

The manipulator device of the present invention for manipulating sheet metal pieces, used for a sheet metal processing machine, comprises a plurality of manipulator units provided with a plurality of gripping elements for gripping and moving a plurality of sheet metal pieces or workpieces at the same time. The manipulator units associate with one another in a predetermined cycle to take up a processed workpiece from the sheet metal processing machine and pass another workpiece to the processing machine for the next or new processing to utilize the processing machine to its maximum capacity.

BRIEF DESCRIPTION OF DRAWINGS

FIGS. 2 and 3 are side views taken on the arrow II of FIG. 1, showing the manipulator device in two different working configurations.

FIG. 4 is a schematic cross section of a sheet metal piece at the end of its bending processes.

FIGS. 9a–9f are schematic views showing a cycle of bending processes of a sheet metal piece.

BEST MODE FOR CARRYING OUT THE INVENTION

Now preferred embodiments of the present invention will be explained in detail with reference to the accompanied drawings.

Figure 1:
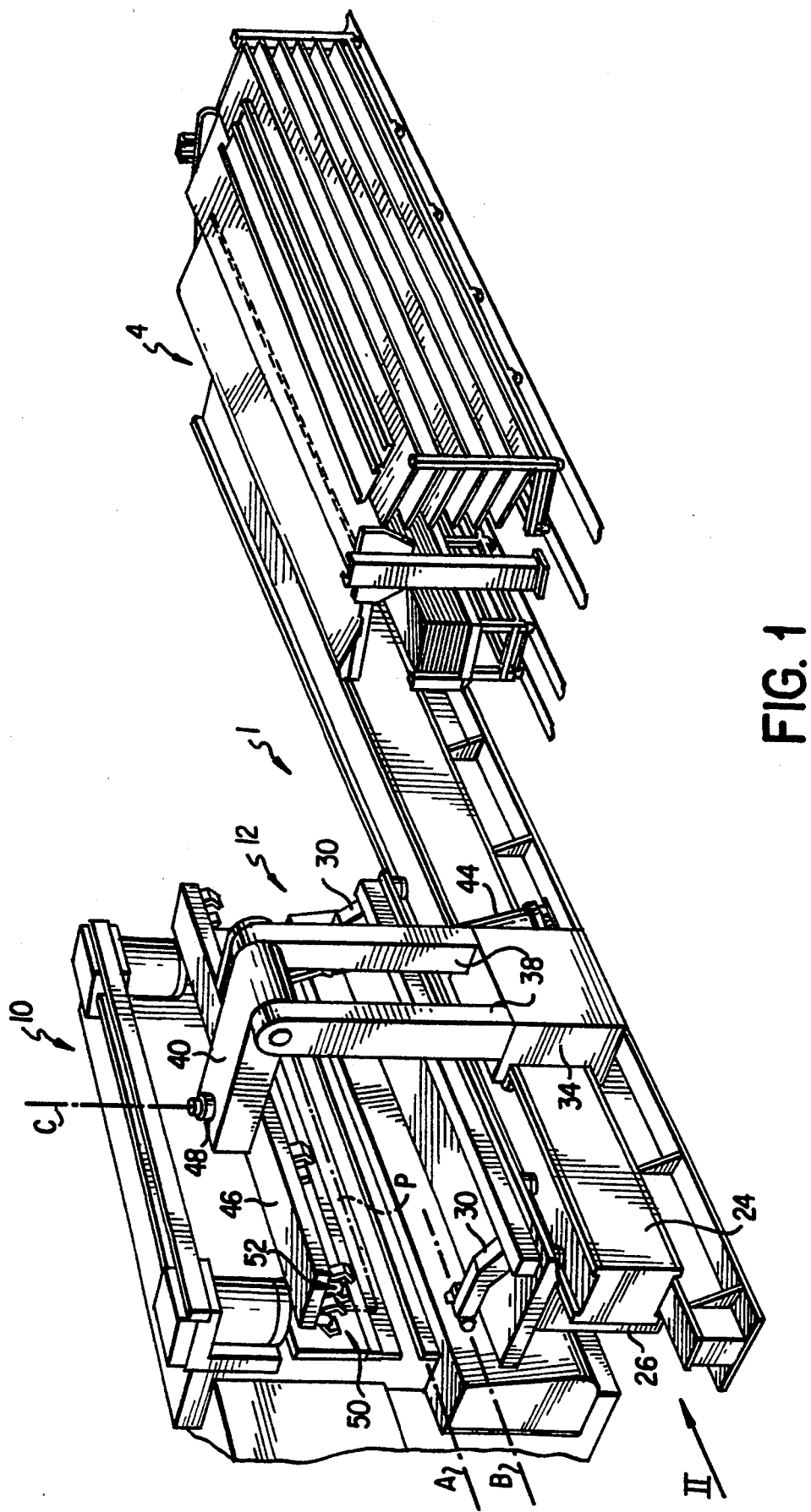
FIG. 1 is a perspective view of a sheet metal processing station including a manipulator device of the present invention.

In FIG. 1, a processing station 1 is illustrated including a sheet metal processing machine 10, a manipulator device 12 of the present invention for manipulating sheet metal pieces, and a station 4 for loading and discharging the sheet metal pieces. The processing machine 10 may be a bending, folding, punching or other processing machine for processing sheet metal pieces.

In FIGS. 1–3, a bending machine or press provided with a punch 14 and a die 16 is shown as an example of the sheet metal processing machine. The punch 14 and the die 16 cooperate along a bending line or reference line A.

With regard to the structure and operation of the loading and discharging station 4 reference may be made to Italian Patent Application No. 68065-A/89, having U.S. counterpart patent application Ser. No. 721,543, filed Jul. 24, 1991 now U.S. Pat. No. 5,193,967.

The manipulator device 12 is constituted mainly of a main manipulator unit 20 and an auxiliary manipulator unit 22 both supported by a fixed guide beam 24 which extends parallel to the reference line A.

The main manipulator unit 20 may be mounted on another guide beam (not shown) fixed to the floor or a guide beam 112 (FIGS. 5–7) fixed at other place, which is separated from and parallel to the said fixed guide beam 24.

The main manipulator unit 20 is of the same type as one that described and illustrated in the above mentioned Italian Pat. application No. 67224-A/88. The main manipulator unit 20 comprises a base structure 26 slidable on a guide 28 formed on the guide beam 24. The base structure 26 supports a pair of motor driven gripper members 30 provided with respective gripping elements 32 movable in three mutually perpendicular directions in a manipulation space MS in front of the zone of the loading of the bending press 10 and also rotatable about an axis B parallel to the reference line A.

The auxiliary manipulator unit 22 includes a motor driven slide 34 slidable on a guide 36 formed on the guide beam 24. The slide 34 has its own driving motor (not shown) which enables the sliding of the auxiliary manipulator unit 22 to be driven independently of the main manipulator unit 20. The slide 34 has a pair of uprights 38 located side by side, and to the upper ends of which are articulated a motor driven arm 40. The arm 40 is driven by an electric motor (not shown) and is connected by a hand grip 42 to a fluid actuator 44 which balances the weight of the arm 40. The free end of the arm 40 carries a bar 46 rotatable relative to the arm 40 about an axis C perpendicular to the reference line A. The bar 46 is rotated about the axis C by an electric motor 48. The bar 46 carries first and second gripping elements 50 and 52 each of which is constituted of a series of Jaws 54, 56 aligned with each other and intended to grip a marginal zone of a sheet metal piece P adjacent a longitudinal edge thereof.

The movements of the main manipulator unit 20 and of the auxiliary manipulator unit 22, as well as those of the loading and discharging device 4 and the operation of the bending press 10, are synchronized by an electronic control unit (not shown) of conventional type.

The text now describes the sequence of operations effected by the manipulator device 12 for forming a sheet metal piece P into the shape illustrated in FIG. 4, starting from a flat metal sheet.

FIG. 3 illustrates a working configuration of the manipulator device 12 which will be considered as the initial configuration of a working cycle. In this configuration, the main manipulator unit 20 is in front of the bending press 10 while the auxiliary manipulator unit 22 is in front of the loading and discharging device 4. The first gripping elements 50 of the auxiliary manipulator unit 22 carry a finished piece P0 to discharge it onto a chute 60 of the loading and discharging device 4. At the same time, the second gripping elements 52 of the auxiliary manipulator unit 22 receive and grip a flat sheet metal piece P2 to be processed from the loading and discharging device 4. Simultaneously, the main manipulator unit 20 effects the second bend 82 (FIG. 4) on a piece P1.

After this, the auxiliary manipulator unit 22 enters into correspondence with the bending press 10 through the main manipulator unit 20, and the main manipulator unit 20 takes up the finished piece P1 to the first gripping elements 50 of the auxiliary manipulator unit 22. Immediately thereafter, the flat metal sheet P2 is transferred by the second gripping elements 52 of the auxiliary manipulator unit 22 to the gripping element of the main manipulator unit 20 (the configuration illustrated in FIG. 2.)

While the main manipulator unit 20 effects the first bend 81 on the piece P2, the auxiliary manipulator unit 22 moves along the guide beam 24 until it is in front of the sheet metal loading and discharging device 4. The auxiliary manipulator unit 22 discharges the worked piece P1 to it and takes up a new flat sheet metal piece P3 (not shown) from it. The auxiliary manipulator unit 22 then moves back in front of the processing machine 10.

The main manipulator unit 20 passes the piece P2 which has already undergone the first bend to the first gripping elements 50 of the auxiliary manipulator unit 22 and then immediately receives the flat sheet metal piece P3 from the second gripping elements 52 of the unit 22.

The main manipulator unit 20 subsequently effects the first bend on the piece P3. Simultaneously, the auxiliary manipulator unit 22 moves into a configuration (not shown) in which the arm 40 extends vertically and rotates the bar 46 through 180° to turn over the piece P2.

After this, the main manipulator unit 20 gives the piece P3 up to the second gripping elements 52 of the auxiliary manipulator unit 20 and then receives the piece P2 which has been turned over by the auxiliary manipulator unit 22.

After this point, the main manipulator unit 20 effects the second and final bend on the piece P2. Simultaneously, the auxiliary manipulator unit 22 overturns the piece P3 in a manner similar to one described above.

Finally, the main manipulator unit 20 gives the finished piece P2 to the first gripping elements 50 of the auxiliary manipulator unit 22. Immediately thereafter, the main manipulator unit 20 grips the piece P3 which has been turned over by the auxiliary manipulator unit 22. At this point, the manipulator device 12 is again in the initial configuration of the cycle and a new working cycle identical to one as described is started.

In the case that only one bend 81 or fold is made on a piece of sheet metal by a bending or folding machine 10, or that other one processing such as a punching of the piece of sheet metal is made by a punching machine, it does not occur to carry out some of the above mentioned phases such as the overturning of the workpiece P after the first processing and the passing of it again to the main manipulator 20 and therefore to the processing machine 10 to accomplish the second or final processing.

Figure 5:
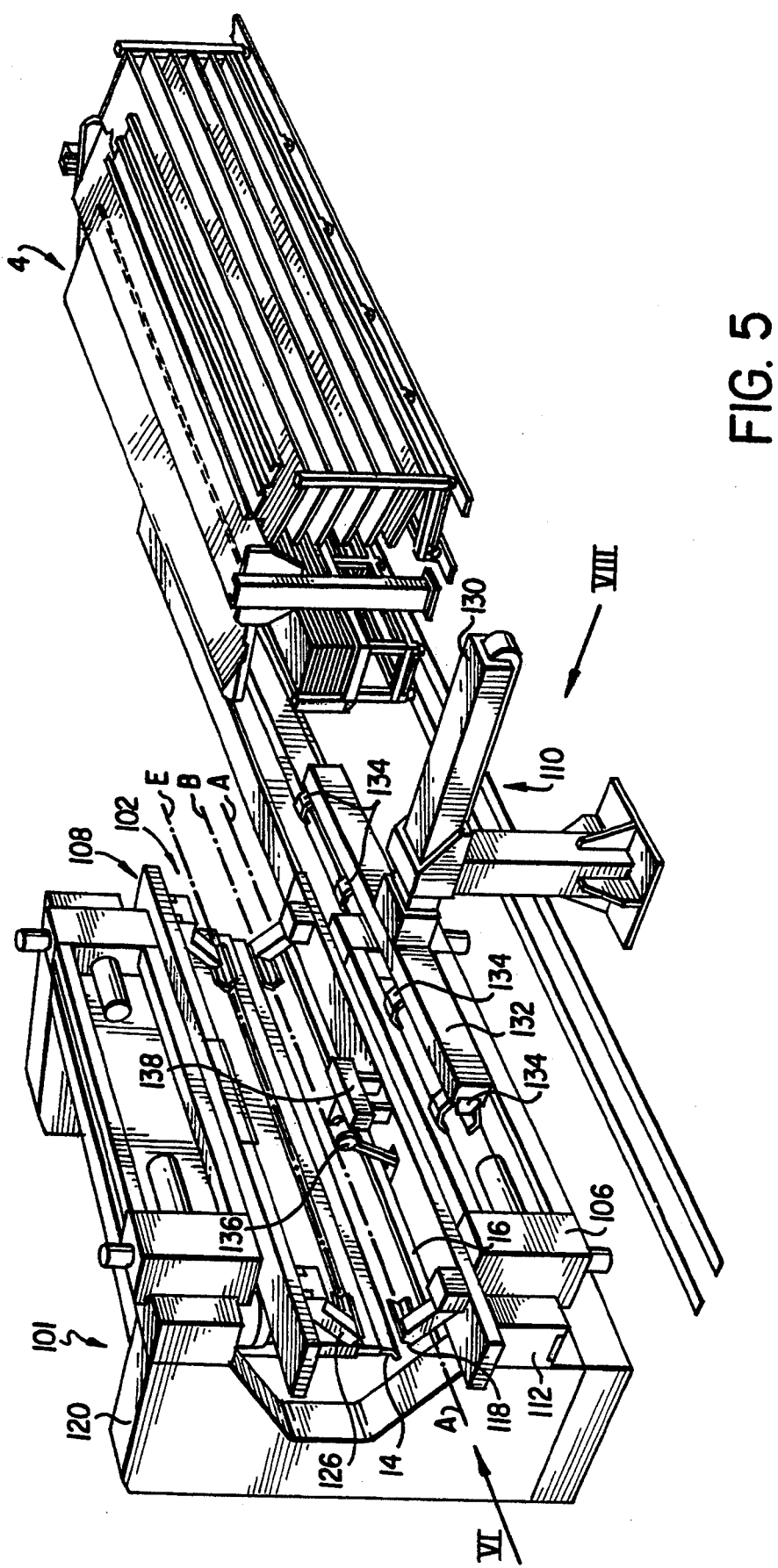
FIG. 5 is a perspective view of a sheet metal processing station including another manipulator of the present invention.

In FIG. 5 there is shown another manipulator device 102 of the present invention as well as a bending machine 101 and a device 4 for loading and discharging sheet metal pieces.

In FIGS. 5-8, the bending machine or press 101 is provided with a punch 14 and a die 16 which cooperate with each other to bend a piece of sheet metal along a bending line or reference line A.

Figure 6:
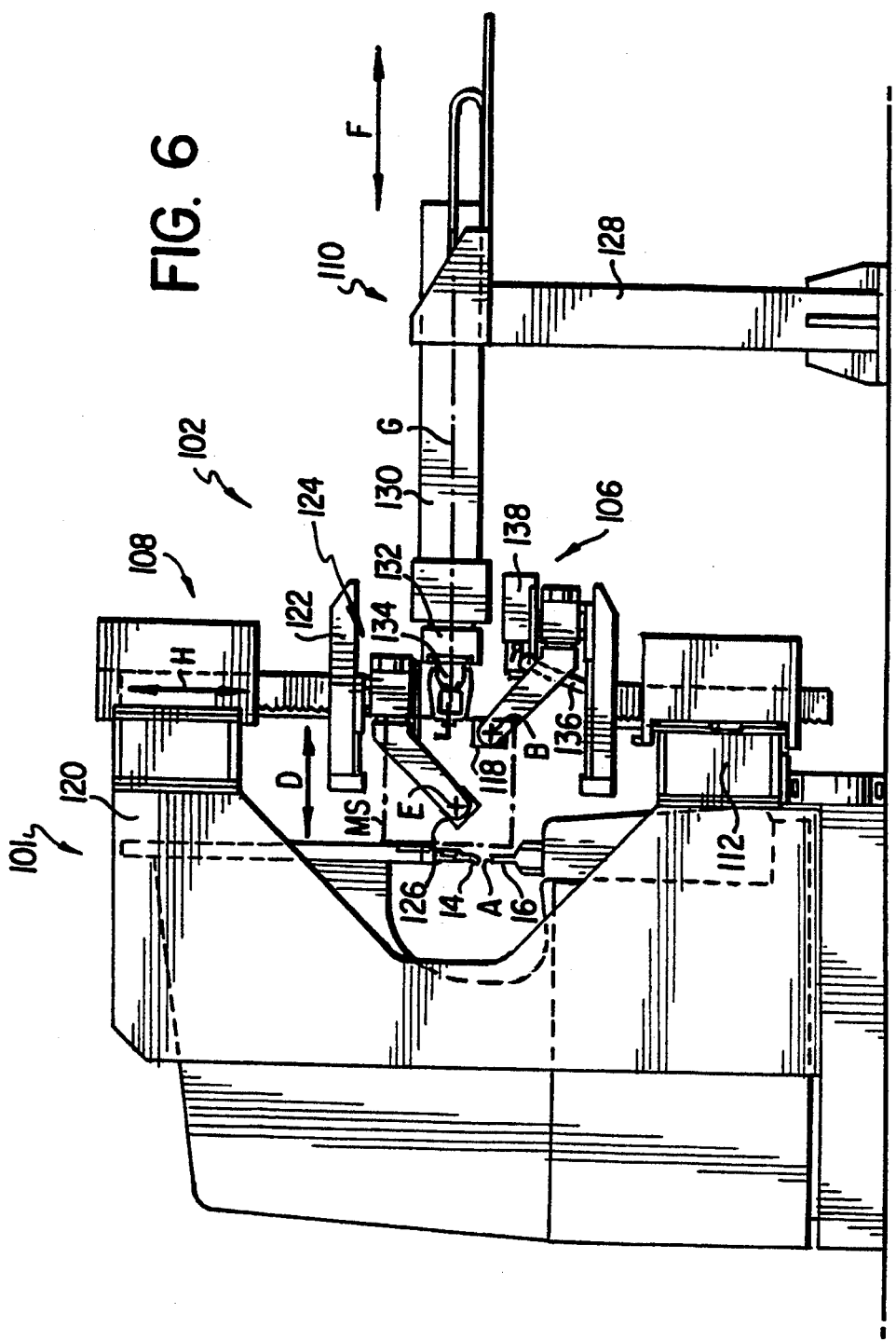
FIGS. 6 and 7 are side views taken on the arrow VI of FIG. 5, showing the manipulator device in two different working configurations.
Figure 7:
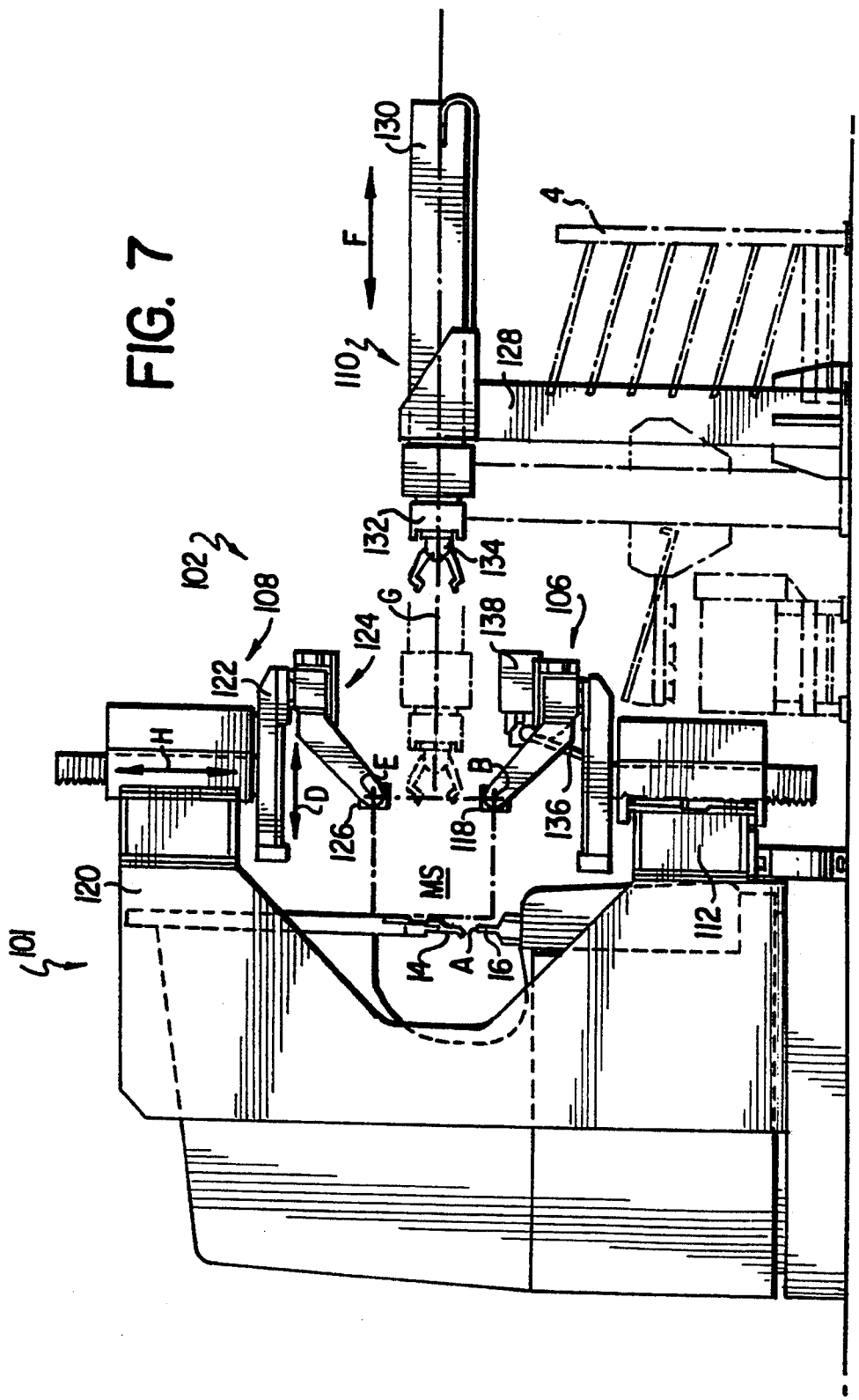
Figure 8:
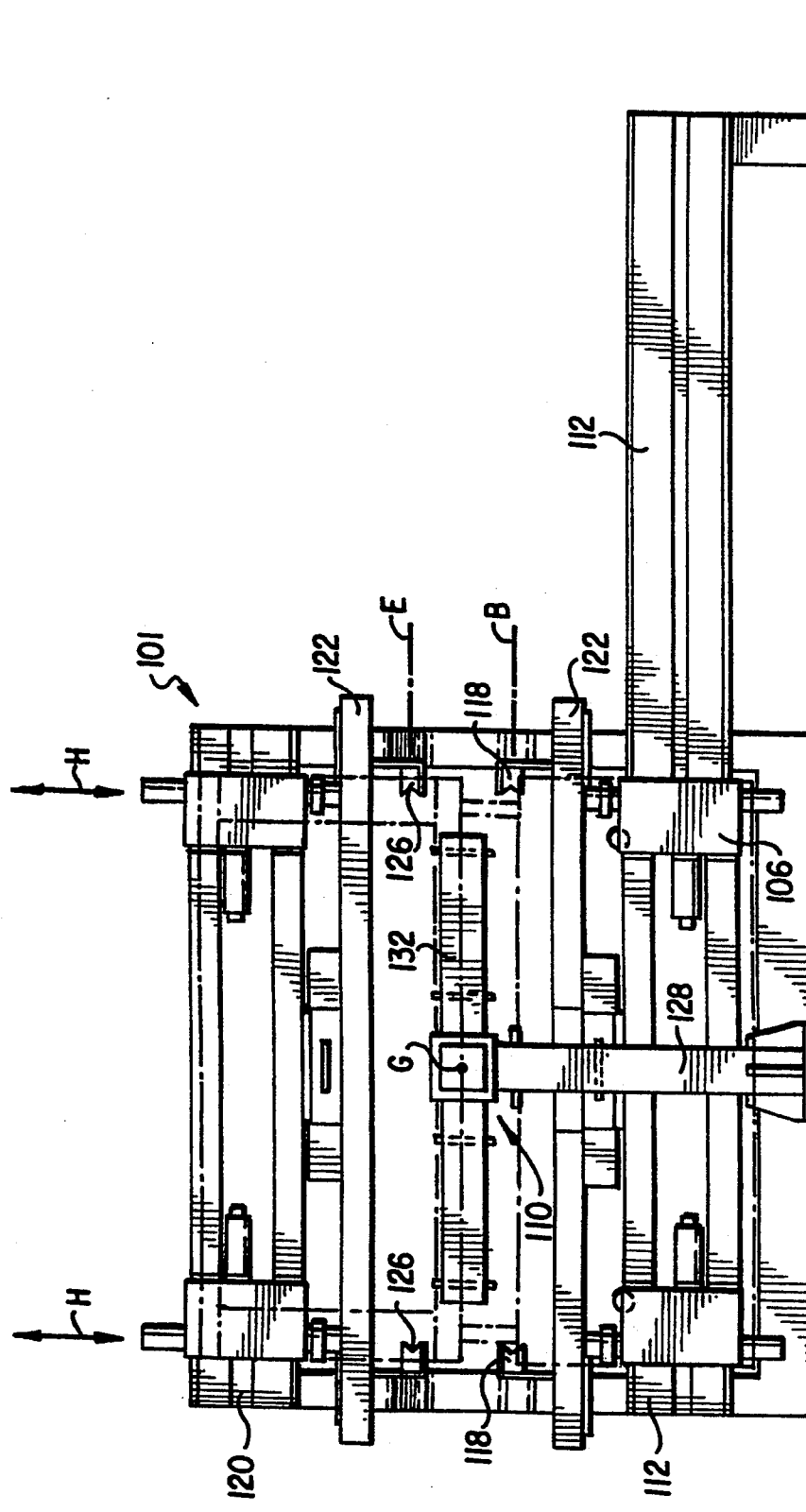
FIG. 8 is a front view taken on the arrow VIII of FIG. 5.

As seen in FIGS. 6 and 7, the manipulator device 102 is constituted mainly of a main and a secondary manipulator units 106, 108 and an auxiliary manipulator unit 110.

The main manipulator unit 106 is slidable on a guide beam 112 which extends parallel to the reference line A of the bending press 101. The main manipulator unit 106 is essentially identical to one described above. This includes a pair of gripping elements 118 movable in three mutually perpendicular directions in a manipulation space MS in front of the zone of loading of the bending press 101 and rotatable about a common axis B parallel to the reference line A.

The secondary manipulator unit 108 is disposed above the first unit 106 and is fixed to a member or part, for example in the case shown in FIGS. 5 to 8 the upper part of the portal structure 120 of the bending press 101. The secondary manipulator unit 108 includes a guide 122 which is movable in the directions indicated by the arrow H in FIGS. 6 and 7 and on which two gripper members 124 are slidable in the directions indicated by the double arrow D. Each gripper member 124 has a gripping element 126 rotatable about an axis E parallel to the reference line A.

The gripping elements 126 of the secondary manipulator unit 108 are movable in the same manipulation space MS as the gripping elements 118 of the first manipulator unit 106. The two manipulator units 106, 108 are driven by a single control processor (not shown) which arranges for the gripping elements 118, 126 to be moved along non-intersecting paths.

The auxiliary manipulator unit 110 includes a support upright 128 fixed to the floor while its upper end carries an arm 130 movable in the directions indicated by the double arrow F. The arm 130, at its end facing the processing machine 101, carries a bar 132 which is rotatable about an axis G perpendicular to the reference line A. The bar 132 in turn carries gripping elements 134 for gripping a marginal zone of a sheet metal piece adjacent a longitudinal side thereof. The auxiliary manipulator unit 110 is intended to grip the sheet metal piece and to overturn it through 180° about the axis G in order for an inverse bend to be formed in the piece being worked.

The main manipulator unit 106 (which is movable along the beam 112) is entrusted with the operations of picking up a flat metal sheet from the loading and discharging device 4 and discharging a finished workpiece onto the device 4. The main manipulator unit 106 is also entrusted with the operations of presenting the flat metal sheet or a workpiece being worked to the press 101 in order for the first bend to be effected after the loading from the device 4 or after the workpiece has been turned over by the auxiliary manipulator unit 110.

The secondary manipulator unit 108, however, is intended to grip the piece after a bend has been effected by the main manipulator unit 106 and to effect all the subsequent bends until the piece is passed to the auxiliary manipulator unit 110 for overturning it or to the main manipulator unit 106 for gripping and carrying it to the discharge device 4.

Given that the main manipulator unit 106 is the one intended to effect the first bend on each piece of flat sheet metal to be worked, this unit may have a central support 136 (the operation of which is described in the above mentioned Italian Patent Application No. 67224-A/88) which serves the purpose of preventing the flexure of the flat metal sheet held at its ends by the gripping elements 118. The main manipulator unit 108 may be also provided with a device 138 for straightenning a curved piece of sheet metal (described in Italian Patent Application No. 67834-A/89, having U.S. counterpart patent application Ser. No. 589,594, filed Sep. 27, 1990 now U.S. Pat. No. 5,117,670) which exerts a force to the flat but curved metal sheet during the execution of the first bend so as to compensate for any defect in the shape of the sheet.

The operating sequence of the manipulator device 102 described above for forming sheet metal pieces into the shapes illustrated in FIG. 9 will now be described.

Starting from an initial working configuration in which the two manipulator units 106, 108 and the auxiliary unit 110 are empty (the configuration illustrated in FIG. 7), the working cycle provides the following phases:

a) the main manipulator unit 106 (located in front of the loading and discharging device 4 takes up a first piece of sheet metal P1 from the loading device 4 and subsequently moves along the guide beam 112 until it is in front of the press 101, b) the main manipulator unit 106 introduces the workpiece P1 into the processing area, for example between the punch 14 and the die 16 of the bending machine 101 and positions it correctly for the first bending operation (FIG. 9a), c) the bending machine 101 effect the first bend in the workpiece P1 (FIG. 9b), and simultaneously the gripping elements 118 of the main manipulator unit 106 release the workpiece P1 and are lowered so as not to obstruct the movement of the gripping elements 126 of the secondary manipulator unit 108; the main manipulator unit 106 moves along the beam 112 until it is in front of the loading and discharging device 4, and at the same time the secondary manipulator unit 108 prepares to grip the workpiece P1 at the end of the first bending operation by means of the gripping elements 126.

The above operations represent the starting routine of the working; the operation described below, however, will be repeated cyclically until the end of the production batch.

d) Starting from the configuration assumed by the manipulator device 102 at the end of the operation (c), the secondary manipulator unit 108 grasp the workpiece P1 and disengages it from the punch 14; at the same time, the main manipulator unit 106 picks up a second sheet P2 from the loading device 4 and carries it to the front of the bending machine 101 in a lowered position so as not to obstruct the secondary manipulator unit 108, e) the secondary manipulator unit 108 passes the first workpiece P1 to the auxiliary manipulator unit 110 which is in the configuration illustrated in FIG. 6; immediately the secondary manipulator unit 108 clears the working zone close to the reference line A of the bending machine 101, and the main manipulator unit 106 presents the sheet P2 to the bending machine 101 for the first bend (FIG. 9a) to be effected, f) while the bending machine 101 carries out the first bend on the workpiece P2, the auxiliary manipulator unit 110 moves into the withdrawn configuration shown in FIG. 7 and overturns the workpiece P1 through 180° by rotating of the bar 132 about the axis G; at the same time, the main manipulator unit 106 prepares to grasp the first workpiece P1 after the overturning, and the secondary manipulator unit 108 prepares to grasp the workpiece P2 at the end of the first bending operation of it, g) the secondary unit 108 grips the workpiece P2 at the end of the first bending operation of it and removes it from the processing area; at the same time, the main manipulator unit 106 receives the workpiece P1 from the auxiliary manipulator unit 110 and moves in front of the bending machine in a lowered position, h) the secondary manipulator unit 108 passes the workpiece P2 to the auxiliary manipulator unit 110 and, as soon as the secondary manipulator unit 108 has cleared the working zone close to the reference line A of the machine 101, the main manipulator unit 106 presents the workpiece P1 to the machine 101 for the second bend (FIG. 9c) to be executed, i) the bending machine 101 effects the second bend on the workpiece P1; at the same time, the auxiliary manipulator unit 110 turns over the workpiece P2, the main manipulator unit 106 prepares to grasp the workpiece P2 after the overturning, and the secondary manipulator unit 108 prepares to grasp the workpiece P1 at the end of the second bending operation, j) the secondary manipulator unit 108 grasps the workpiece P1 at the end of the second bending operation, disengages it from the punch 14 and repositions it for the execution of the third bend (FIG. 9e); at the same time, the main manipulator unit 106 receives the workpiece P2 from the auxiliary manipulator unit 110 and moves in front of the bending machine 101 in a lowered position, k) the bending machine 101 effects the third bend on the workpiece P1 (FIG. 9f); at the same time, the secondary manipulator unit 108 prepares to take the workpiece P1 after the bending operation while the main manipulator unit 106 remains in front of the bending machine 101 in a lowered position ready to present the workpiece P2 to the bending machine 101 for the second bend to be executed, l) the secondary manipulator unit 108 grips the finished workpiece P1, removes it from processing area and passes it to the auxiliary manipulator unit 110; immediately after the secondary manipulator unit 108 has cleared the working zone close to the reference line A, the main manipulator unit 106 presents the workpiece P2 to the bending machine 101 for the second bend (FIG. 9c) to be executed, m) while the bending machine 101 effects the second bend on the workpiece P2 (FIG. 9d), the secondary manipulator unit 108 prepares to grip the workpiece P2 again at the end of the bending operation, and the main manipulator unit 106 takes the finished workpiece P1 from the auxiliary manipulator unit 110 (which in this case simply has a function of a temporary repository and does not effect any overturning) and moves in front of the loading and discharging device 4, n) the secondary manipulator unit 108 grips the workpiece P2, removes it from the processing area and repositions it for the third bend (FIG. 9e) to be executed; at the same time, the main manipulator unit 106 takes a third piece of sheet metal from the loading device 4 and moves back in front of the bending machine 101 in a lowered position, ready to present the workpiece P3 for the first bend to be effected, o) the bending machine 101 effects the third and final bend in the workpiece P2, removes it from the processing area and then passes it to the auxiliary manipulator unit 110; as soon as the secondary manipulator unit 108 has cleared the working zone close to the reference line A, the main manipulator unit 106 passes the workpiece P3 to the bending machine 101 for the first bend (FIG. 9a) to be executed, p) the bending machine 101 effects the first bend in the piece P3 (FIG. 9b), and at the same time the main manipulator unit 106 takes the finished workpiece P2 from the auxiliary manipulator unit 110 (which in this case has solely the function of a temporary repository and does not overturn the workpiece) and then moves in front of the loading and discharging device 4.

At this point, the cycle is concluded, and the working continues with the operating of phases (d) to (p) being repeated cyclically until the end of the production batch.

INDUSTRIAL APPLICABILITY

The manipulator device of the present invention can grip and carry a plurality of workpieces at the same time to provide an associated sheet metal processing machine with a workpiece and taken up a processed workpiece from the processing machine and therefore enables the processing machine to process the workpieces continuously reducing its inoperative time and therefore increasing its productivity.

We claim:

1. A manipulator device for a sheet metal processing machine, the sheet metal processing machine having a pair of tools extending along a reference line A, the manipulator device comprising:
   a main manipulator unit movable in front of the processing machine and having at least one gripping element for gripping a sheet metal workpiece, the main manipulator unit being adapted to take up a sheet metal workpiece from and pass a sheet metal workpiece to the processing machine; and
   an associated auxiliary manipulator unit having first and second gripping elements, each of the first and second gripping elements taking up a sheet metal workpiece from the main manipulator unit and passing a sheet metal workpiece to the main manipulator unit, said auxiliary manipulator unit including means for rotating the first and the second gripping elements about a certain axis perpendicular to a reference line of the processing machine.

2. The manipulator device according to claim 1, wherein the first gripping elements of the auxiliary manipulator unit take up and grip the workpiece from the main manipulator, and that the second gripping elements of the auxiliary manipulator unit pass another workpiece of the main manipulator.

3. The manipulator device according to claim 1, wherein the auxiliary manipulator unit is arranged to overturn a workpiece to be passed to the main manipulator unit for the next processing while the main manipulator unit cooperates with the processing machine to process another workpiece.

4. The manipulator device according to claim 1, further comprising a guide beam which extends parallel to the reference line and is provided with first and second guides, the auxiliary manipulator unit being slidably supported on the first guide, and the main manipulator being slidably supported on the second guide.

5. The manipulator device according to claim 1, further comprising a guide beam which extends parallel to the reference line, the main and auxiliary manipulator units being mounted on the guide beam to slide independently.

6. The manipulator device according to any one of claims 2, 4 or 5, wherein the auxiliary manipulator unit moves in a phase of a cyclic processing to an associated sheet metal loading and discharging device and discharge a finished workpiece to and take up a sheet metal workpiece from said sheet metal loading and discharging device.

7. The manipulator device according to claim 6, wherein the main manipulator unit cooperates with the processing machine to process a workpiece when the auxiliary manipulator unit moves to the loading and discharging device and carries out said operations.

* * * * *